(12) United States Patent
Fujiwara

(10) Patent No.: US 7,799,714 B2
(45) Date of Patent: Sep. 21, 2010

(54) OPTICAL GLASS, PRECISION PRESS MOLDING PREFORM AND MANUFACTURING METHOD OF THE SAME, OPTICAL ELEMENT AND MANUFACTURING METHOD OF THE SAME

(75) Inventor: Yasuhiro Fujiwara, Tokyo (JP)

(73) Assignee: Hoya Corporation, Tokyo (JP)

( * ) Notice: Subject to any disclaimer, the term of this patent is extended or adjusted under 35 U.S.C. 154(b) by 788 days.

(21) Appl. No.: 11/540,608

(22) Filed: Oct. 2, 2006

(65) Prior Publication Data

US 2007/0111875 A1 May 17, 2007

(30) Foreign Application Priority Data

Sep. 30, 2005 (JP) .............. 2005-287409
Mar. 16, 2006 (JP) .............. 2006-071905

(51) Int. Cl.
*C03C 3/19* (2006.01)
*C03C 3/16* (2006.01)
*C03B 5/26* (2006.01)

(52) U.S. Cl. .............. 501/47; 501/45; 65/126
(58) Field of Classification Search ............ 501/45, 501/47; 65/126
See application file for complete search history.

(56) References Cited

U.S. PATENT DOCUMENTS

| | | | | |
|---|---|---|---|---|
| 3,926,649 | A * | 12/1975 | Ray et al. ............ | 501/47 |
| 3,979,322 | A * | 9/1976 | Alexeev et al. ....... | 252/301.6 P |
| 3,989,532 | A * | 11/1976 | Ray et al. ............ | 428/426 |
| 4,026,714 | A * | 5/1977 | Lewis ............... | 501/47 |
| 4,110,245 | A * | 8/1978 | Yamashita ........... | 501/87 |
| 4,248,732 | A * | 2/1981 | Myers et al. ......... | 252/301.6 P |
| 4,391,915 | A * | 7/1983 | Meden-Piesslinger et al. ............... | 501/48 |
| 4,661,284 | A * | 4/1987 | Cook et al. ........... | 252/301.4 P |
| 4,929,387 | A * | 5/1990 | Hayden et al. ........ | 252/301.4 P |
| 5,173,456 | A * | 12/1992 | Hayden et al. ........ | 501/45 |
| 5,256,604 | A * | 10/1993 | Aitken .............. | 501/45 |
| 5,529,961 | A * | 6/1996 | Aitken et al. ......... | 501/45 |
| 5,607,886 | A * | 3/1997 | Onozawa ............ | 501/73 |
| 5,668,066 | A * | 9/1997 | Oguma et al. ......... | 501/45 |
| 5,965,469 | A * | 10/1999 | Kilgo et al. .......... | 501/48 |
| 6,667,258 | B2 * | 12/2003 | Quinn ............... | 501/48 |
| 7,157,391 | B2 * | 1/2007 | Kasuga et al. ........ | 501/45 |
| 7,371,703 | B2 * | 5/2008 | Masumura et al. ..... | 501/44 |
| 7,396,787 | B2 * | 7/2008 | Ritter et al. ......... | 501/48 |
| 7,419,923 | B2 * | 9/2008 | Mori et al. .......... | 501/47 |
| 7,538,051 | B2 * | 5/2009 | Fujiwara et al. ...... | 501/48 |
| 7,582,579 | B2 * | 9/2009 | Ohkawa et al. ....... | 501/48 |
| 2002/0010065 | A1 * | 1/2002 | Masumura et al. ..... | 501/57 |
| 2004/0063563 | A1 * | 4/2004 | Masumura et al. ..... | 501/44 |
| 2004/0092378 | A1 * | 5/2004 | Wolff et al. ......... | 501/45 |
| 2004/0138043 | A1 * | 7/2004 | Kasuga et al. ........ | 501/45 |
| 2004/0259714 | A1 * | 12/2004 | Fujiwara et al. ...... | 501/45 |
| 2005/0003948 | A1 * | 1/2005 | Yamazaki ........... | 501/45 |
| 2005/0054511 | A1 * | 3/2005 | Fujiwara et al. ...... | 501/45 |
| 2005/0143250 | A1 * | 6/2005 | Fujiwara et al. ...... | 501/48 |
| 2005/0159291 | A1 * | 7/2005 | Ritter et al. ......... | 501/48 |
| 2006/0065019 | A1 * | 3/2006 | Kolberg et al. ....... | 65/99.4 |
| 2006/0150682 | A1 * | 7/2006 | Fujiwara et al. ...... | 65/102 |
| 2008/0187737 | A1 * | 8/2008 | Fujiwara et al. ...... | 428/220 |

FOREIGN PATENT DOCUMENTS

| | | |
|---|---|---|
| EP | 1477463 A1 | 11/2004 |
| JP | 55121924 A | 9/1980 |
| JP | 56073644 A | 6/1981 |
| JP | 60171244 A | 4/1985 |
| JP | 02188442 A | 7/1990 |
| JP | 04-033239 A | 2/1992 |
| JP | 11199269 A | 7/1999 |
| JP | 2004168593 A | 6/2004 |
| JP | 2004-315324 A | 11/2004 |
| WO | 2004/041741 | 5/2004 |

OTHER PUBLICATIONS

Japanese Office Action dated Feb. 24, 2009.
Japanese Office Action corresponding to Japanese Patent Application No. 2006-071905.
Japanese Office Action dated Oct. 6, 2009, corresponding to JP 2006-071905.

* cited by examiner

*Primary Examiner*—Karl E Group
*Assistant Examiner*—Elizabeth A Bolden
(74) *Attorney, Agent, or Firm*—Sughrue Mion, PLLC

(57) ABSTRACT

The optical glass comprises equal to or greater than 5 mole percent of $P_2O_5$, has an Abbé number of equal to or greater than 58 and a glass transition temperature of equal to or less than 570 degree Celsius, and has an alkalinity resistance defined as a rate of weight reduction of equal to or less than 17 micrograms/($cm^2$·hour) when the surface of said optical glass which has been optically polished is immersed in 0.01 mole/liter of NaOH aqueous solution at 50 degree Celsius.

18 Claims, 1 Drawing Sheet

OPTICAL GLASS, PRECISION PRESS MOLDING PREFORM AND MANUFACTURING METHOD OF THE SAME, OPTICAL ELEMENT AND MANUFACTURING METHOD OF THE SAME

CROSS-REFERENCE TO RELATED APPLICATIONS

This application claims benefit of priority under 35 USC 119 to Japanese Patent Application No. 2005-287409 filed on Sep. 30, 2005 and Japanese Patent Application No. 2006-071905 filed on Mar. 16, 2006.

BACKGROUND OF THE INVENTION

1. Field of the Invention

The present invention relates to $P_2O_5$-containing optical glass that is suited to precision press molding, a precision press molding preform comprised of this glass, a method for manufacturing the same, an optical element comprised of this glass, and a method for manufacturing the same.

2. Discussion of the Background

Low-dispersion glass is useful optical glass that is employed as a material in various optical elements. For example, Japanese Unexamined Patent Publication (KOKAI) Showa No. 60-171244 discloses phosphate glass exhibiting low dispersibility with an Abbé number, vd (nud), of about 60 to 73.

The aforementioned phosphate glass is appealing due to its low dispersion, and lenses made from it have a great deal of potential.

However, lenses made from this glass present a problem in that their surface properties deteriorate when cleaned. Examples of deterioration of surface properties are scratches and clouding of the lens surface caused by cleaning, both of which greatly compromise the performance of the lens as an optical element. Further, when an antireflective film is applied, the film adheres poorly, separating over time.

The present invention was devised to solve the above problems and it is an object of the present invention to provide optical glass having an excellent durability for cleaning and yielding a low-dispersion optical element, this optical element, a method for manufacturing the optical element, a glass preform for manufacturing the optical element, and a method for manufacturing the glass preform.

SUMMARY OF THE INVENTION

The present invention relates to:

optical glass comprising equal to or greater than 5 mole percent of $P_2O_5$, having an Abbé number of equal to or greater than 58 and a glass transition temperature of equal to or less than 570 degree Celsius, and having an alkalinity resistance defined as a rate of weight reduction of equal to or less than 17 micrograms/($cm^2 \cdot$hour) when the surface of said optical glass which has been optically polished is immersed in 0.01 mole/liter of NaOH aqueous solution at 50 degree Celsius;

a precision press molding preform being comprised of the optical glass of the present invention;

a method for manufacturing a precision press molding preform, wherein glass melt of a prescribed weight is separated from glass melt flow flowing out from an outflow pipe to form a precision press molding preform comprised of the optical glass of the present invention;

a method for manufacturing a precision press molding preform, wherein glass melt is caused to flow out and molded to obtain a glass molded article, and then the obtained glass molded article is mechanically processed to manufacture a precision press molding preform comprised of the optical glass of the present invention;

an optical element being comprised of the optical glass of the present invention;

a method for manufacturing an optical element, comprising heating the precision press molding preform of the present invention and precision press molding said heated preform with a pressing mold; and a method for manufacturing an optical element, comprising heating the precision press molding preform manufactured by the method of the present invention and precision press molding said heated preform with a pressing mold.

According to the present invention, it is possible to provide optical glass for obtaining an optical element having a low dispersion characteristic and good resistance to cleaning, this optical element, a method for manufacturing this optical element, a glass preform for producing this optical element, and a method for manufacturing the glass preform.

Figure 1:
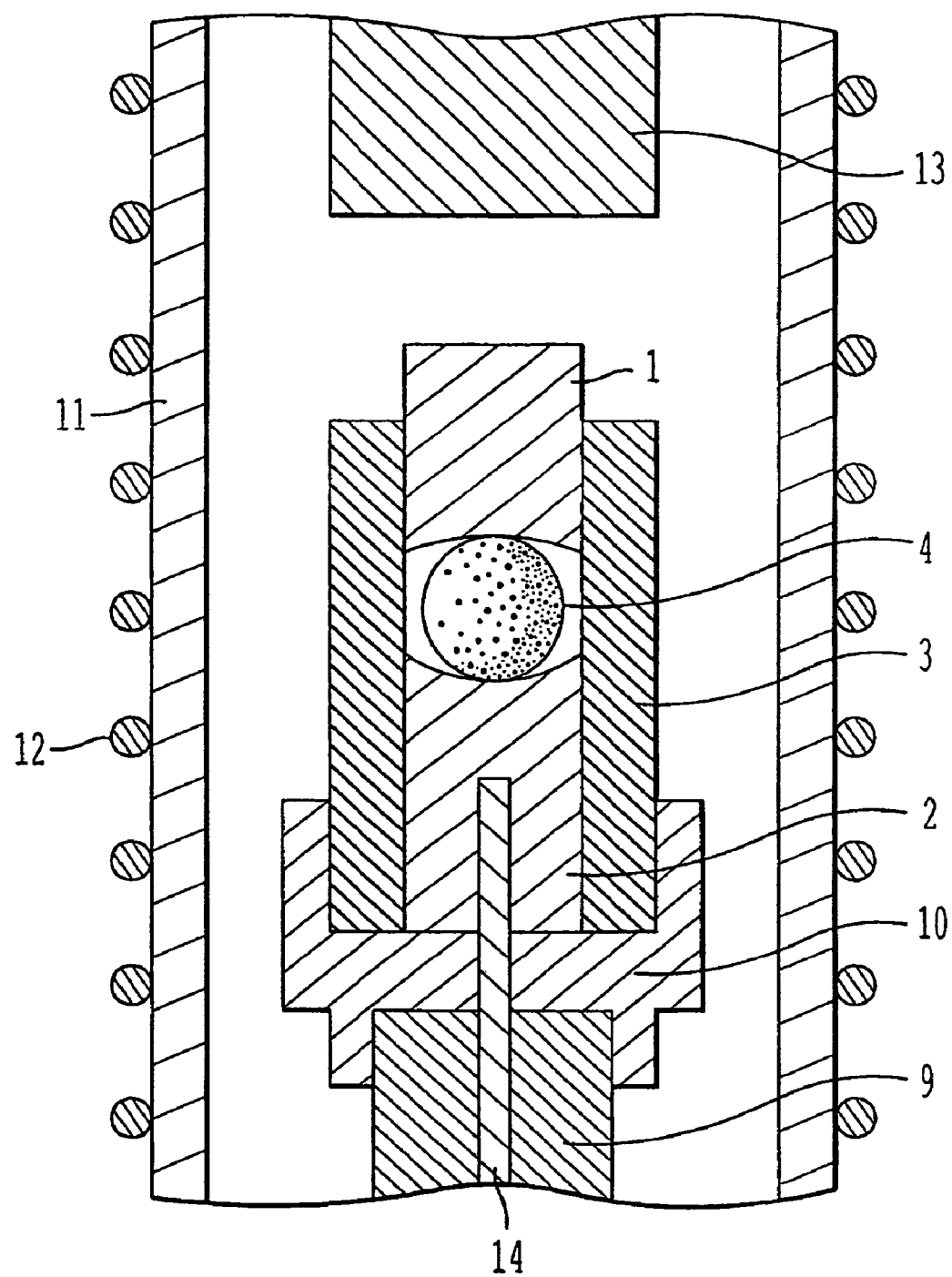
FIG. 1 a drawing of a press apparatus employed in Example 23.

The present invention will be described in greater detail below.

The optical glass of the present invention comprises equal to or greater than 5 mole percent of $P_2O_5$, has an Abbé number, vd (nud), of equal to or greater than 58 and a glass transition temperature, Tg, of equal to or less than 570 degree Celsius, and has an alkalinity resistance defined as a rate of weight reduction of equal to or less than 17 micrograms/($cm^2 \cdot$hour) when the surface of said optical glass which has been optically polished is immersed in 0.01 mole/liter of NaOH aqueous solution at 50 degree Celsius.

Common examples of glasses having low dispersion properties with an Abbé number (vd) of equal to or greater than 58 are phosphate glasses and fluorophosphate glasses. The present inventors conducted extensive research into how the surface properties of optical elements comprised of these glasses deteriorate, resulting in the following discoveries.

In the course of finishing the surface of an optical element by polishing, minute scratches form on the surface of the optical element that can be seen neither by eye nor under magnification by optical microscopy. These scratches can be suitably referred to as "latent scratches": so long as the glass surface is not chemically treated, they do not affect optical performance. However, as set forth above, in the course of cleaning an optical element that has been obtained, the cleaning action chemically alters the glass surface, causing the minute scratches to grow and compromising surface properties to a degree permitting visual recognition. The reason for this deterioration in surface properties is thought to be latent scratches caused by polishing. Methods that do not employ mechanical processing, such as forming an optically functional surface (e.g., a lens surface) by precisely transferring to glass the molding surfaces of a pressing mold by press molding heated glass, might be thought not to form latent scratches so that the surface properties of the glass would not deteriorate even when cleaned. However, optical elements that are manufactured by precision press molding without polishing still exhibit deterioration in surface properties and the optical properties thereof deteriorate—albeit to a lesser degree than in optical elements manufactured by polishing—when the optical elements are washed. Since precision press molding molds glass that is in a softened or nearly softened state without abrasion of the solidified glass such as is done in polishing, it was thought that the above problem would not occur.

In recent years, demand has developed for optical elements of even greater precision, such as optical elements achieving high-level imaging performance that are capable of use as high-precision image pickup elements with a number of pixels exceeding one million. Producing such optical elements by precision press molding requires high-precision processing of the molding surfaces of the pressing mold and the transfer of the molding surfaces of the mold to the glass with extremely high precision. Precision press molding is suited to the manufacturing of optical elements of special shapes such as aspherical lenses and macrolenses at a productivity that cannot be achieved by polishing processes. Pressing molds for making optical elements of such special shapes are produced by cutting mold materials.

However, fine observation of the molding surfaces of a pressing mold that has been machined by cutting reveals minute irregularities produced by cutting. These irregularities themselves are not of a size that would compromise the performance of optical elements obtained. However, it was discovered that when these irregularities were precisely transferred to the glass, extremely minute irregularities similar to latent scratches were formed on the surfaces of optical elements that were precision press molded. It was also found that when an optical element having such minute irregularities was washed, the problem of deterioration of surface properties occurred.

The optical glass of the present invention, devised on the basis of the above discoveries, comprises equal to or greater than 5 mole percent of $P_2O_5$, has an Abbé number (vd) of equal to or greater than 58 and a glass transition temperature (Tg) of equal to or less than 570 degree Celsius, and has an alkalinity resistance defined as a rate of weight reduction of equal to or less than 17 micrograms/($cm^2$·hour) when the surface of said optical glass which has been optically polished is immersed in 0.01 mole/liter of NaOH aqueous solution at 50 degree Celsius.

To achieve a low dispersion characteristic with an Abbé number (vd) of equal to or greater than 58, the base composition of the glass of the present invention comprises equal to or greater than 5 mole percent of $P_2O_5$. Further, to permit precision press molding that does not cause the deterioration of surface properties to the degree that polishing methods do, the glass transition temperature (Tg) is set at equal to or less than 570 degree Celsius. Further, the above alkalinity resistance is imparted so that portions to which minute cut marks on the molding surface of the pressing mold have been transferred do not become starting points for the deterioration of surface properties during cleaning. By comprehensively combining these properties, an effect of preventing the deterioration of surface properties can be achieved.

In the optical glass of the present invention, there is no specific upper limit to the Abbé number (vd). From the perspective of obtaining glass suited to mass production, the measure of the upper limit of 100 is appropriate. A desirable range of the Abbé number (vd) is equal to or greater than 59, with a range of equal to or greater than 60 being preferred, a range of equal to or greater than 61 being of greater preference, a range of equal to or greater than 62 being of still greater preference, a range of equal to or greater than 63 being of still greater preference, a range of equal to or greater than 64 being of still greater preference, and a range of equal to or greater than 65 being of still greater preference. An upper limit to the Abbé number (vd) of equal to or less than 90 is desirable, with equal to or less than 80 being preferred, equal to or less than 75 being of greater preference, equal to or less than 70 being of still greater preference, equal to or less than 69 being of still greater preference, and equal to or less than 68 being of still greater preference.

To enhance the various above-stated properties and obtain glass better suited to mass production, the $P_2O_5$ content is, denoted as a mole percentage, preferably equal to or greater than 10 percent, more preferably equal to or greater than 15 percent, further preferably equal to or greater than 19 percent, still more preferably equal to or greater than 22 percent, still more preferably equal to or greater than 24 percent, still more preferably equal to or greater than 25 percent, still more preferably equal to or greater than 26 percent, and still more preferably equal to or greater than 27 percent.

The upper limit to the $P_2O_5$ content, denoted as a mole percentage, is preferably less than 90 percent, more preferably less than 80 percent, further preferably less than 70 percent, still more preferably less than 60 percent, still more preferably less than 55 percent, still more preferably less than 50 percent, still more preferably less than 45 percent, still more preferably less than 43 percent, still more preferably less than 41 percent, still more preferably less than 39 percent, still more preferably less than 37 percent, and still more preferably less than 35 percent.

The glass transition temperature is preferably equal to or less than 560 degree Celsius, with a range of equal to or less than 550 degree Celsius being preferred, a range of equal to or less than 540 degree Celsius being of greater preference, a range of equal to or less than 530 degree Celsius being of still greater preference, a range of equal to or less than 520 degree Celsius being of still greater preference, a range of equal to or less than 515 degree Celsius being of still greater preference, a range of equal to or less than 510 degree Celsius being of still greater preference, a range of equal to or less than 505 degree Celsius being of still greater preference, a range of equal to or less than 500 degree Celsius being of still greater preference, a range of equal to or less than 495 degree Celsius being of still greater preference, and a range of equal to or less than 490 degree Celsius being of still greater preference. The measure of the lower limit of equal to or higher than 200 degree Celsius is appropriate. Reducing the glass transition temperature is desirable to permit a reduction in the pressing temperature and to extend the service lifetime of the pressing mold. However, an excessive reduction may cause a reduction in the durability and the like of the glass. Thus, in addition to setting the upper limit as stated above, the lower limit is preferably set to equal to or higher than 250 degree Celsius, with equal to or higher than 300 degree Celsius being more preferred, equal to or higher than 350 degree Celsius being of greater preference, equal to or higher than 400 degree Celsius being of still greater preference, and equal to or higher than 450 degree Celsius being of still greater preference.

From the above perspectives, the alkalinity resistance is preferably such that the rate of weight reduction per unit area per unit time when the surface of the optical glass which has been optically polished is immersed in 0.01 mole/liter of NaOH aqueous solution at 50 degree Celsius is equal to or less than 15 micrograms/($cm^2$·hour), with equal to or less than 13 micrograms/($cm^2$·hour) being preferred, equal to or less than 11 micrograms/($cm^2$·hour) being of greater preference, equal to or less than 10 micrograms/($cm^2$·hour) being of still greater preference, equal to or less than 9 micrograms/($cm^2$·hour) being of still greater preference, equal to or less than 8 micrograms/($cm^2$·hour) being of still greater preference, equal to or less than 7 micrograms/($cm^2$·hour) being of still greater preference, equal to or less than 6 micrograms/($cm^2$·hour) being of still greater preference, equal to or less than 5 micrograms/(cm$^2$·hour) being of still greater preference, equal to or less than 4 micrograms/(cm$^2$·hour) being of still greater preference, equal to or less than 3 micrograms/(cm$^2$·hour) being of still greater preference, equal to or less than 2 micrograms/(cm$^2$·hour) being of still greater preference, and equal to or less than 1 microgram/(cm$^2$·hour) being optimal.

The alkalinity resistance of optical glass can be classified as one of five levels based on the weight reduction rate under the above-stated conditions, namely:

level 1: a weight reduction rate of equal to or less than 0.01 mg/(cm$^2$·15 h);

level 2: a weight reduction rate ranging from 0.02 to 0.10 mg/(cm$^2$·15 h);

level 3: a weight reduction rate ranging from 0.11 to 0.20 mg/(cm$^2$·15 h);

level 4: a weight reduction rate ranging from 0.21 to 0.30 mg/(cm$^2$·15 h); and level 5: a weight reduction rate of equal to or greater than 0.31 mg/(cm$^2$·15 h), with values of less than 0.01 being rounded off.

When converted to weight reduction rates per hour, these become:

level 1: a weight reduction rate of less than 1 microgram/(cm$^2$·h);

level 2: a weight reduction rate of equal to or greater than 1 microgram but less than 7 micrograms/(cm$^2$·h);

level 3: a weight reduction rate of equal to or greater than 7 micrograms but less than about 13.667 micrograms/(cm$^2$·h);

level 4: a weight reduction rate of equal to or greater than about 13.667 micrograms but less than about 20.333 micrograms/(cm$^2$·h); and level 5: a weight reduction rate of equal to or greater than about 20.333 micrograms/(cm$^2$·h).

These are five convenient levels of alkalinity resistance devised based on the distribution of the alkalinity resistance of numerous optical glasses, and the boundaries of these levels have no particular physical significance. However, catalogs and the like of optical glasses sometimes provide descriptions based on these levels when roughly indicating the alkalinity resistance of glasses.

Generally, glasses with an alkalinity resistance of equal to or higher than 20 micrograms/(cm$^2$·hour) are of low alkalinity resistance and have a high probability of developing latent scratches and the like when cleaned. Generally, low dispersion optical glasses containing large amounts of phosphoric acid and alkalis but not containing components yielding high refractive index and/or high melting point, such as Ti and Nb, tend to have low alkalinity resistance.

While most of the glasses of the present invention comprise both phosphoric acid and alkalis as essential components, they also have weight reduction rates under the above-stated conditions of equal to or less than 17 micrograms/(cm$^2$·h), and tend not to develop latent scratches.

A preferred embodiment of the optical glass of the present invention has the following thermal stability to effectively suppress devitrification of the glass when the glass is heated during precision press molding.

A molded glass article having a flat free surface on top is prepared by casting in a casting mold from a molten state in air. The term "free surface" means a surface that is molded without transferring a surface of the pressing mold. This molded glass article is cut to prepare a 1×1×2 cm$^3$ rectangular parallelepiped glass sample. The cutting is conducted so that one of the surfaces (1×2 cm$^2$) of the sample becomes part of a free surface. The optical glass of the present invention preferably has a thermal stability such that a glass piece of the optical glass, which has been heated at a rate of 30 degree Celsius/minute to 610 degree Celsius, maintained at 610 degree Celsius for 10 minutes, and then stood to cool, comprises equal to or fewer than 10 inside crystal particles 100 nm or larger in size per cm$^3$. By imparting such thermal stability, devitrification of the glass when the glass is heated during precision press molding can be effectively suppressed. The above number of inside crystal particles per unit of volume is preferably equal to or fewer than 8/cm$^3$, more preferably equal to or fewer than 6/cm$^3$, further preferably equal to or fewer than 5/cm$^3$, still more preferably equal to or fewer than 3/cm$^3$, and still more preferably equal to or fewer than 1/cm$^3$, with no crystal particles at all being optimal.

Since it is desirable for no defects such as crystal precipitation or clouding to be found in the above free surface portions of the glass, glass having few crystalline nuclei precipitating in the above free surface following standing to cool is desirable. Specifically, glass having an average density of crystal particles 0.1 to 30 micrometers in diameter of equal to or fewer than 1×10$^5$/cm$^2$ is preferable, glass having an average density of crystal particles 0.1 to 100 micrometers in diameter of equal to or fewer than 1×10$^4$/cm$^2$ is more preferable, glass having an average density of crystal particles 0.1 to 300 micrometers in diameter of equal to or fewer than 1×10$^3$/cm$^2$ is of greater preference, glass having an average density of crystal particles 0.1 to 1,000 micrometers in diameter of equal to or fewer than 1×10$^2$/cm$^2$ is of even greater preference, and glass having an average density of crystal particles 0.1 to 3,000 micrometers in diameter of 0 to 10/cm$^2$ is particularly preferred.

Another preferred embodiment of the present invention is glass having a haze value of equal to or less than 10 percent. The haze value is the ratio of scattered light due to alteration layers and precipitate forming on the polished surfaces of glass to transmitted light when glass that has been optically polished on both surfaces is kept for one week in a clean thermo-hygrostat at a temperature of 65 degree Celsius and a humidity of 90 percent and white light is caused to pass perpendicularly through the glass. Glasses with high haze values are glasses of low chemical durability in which the rate of corrosion of the glass by various chemical components, such as water droplets, steam, and gases in the use environment that adhere to the glass, and the rate at which reaction products are produced on the glass surface, are high. When such a glass is employed in an optical element, corrosion of the glass and products on the surface of the glass cause foreign matter to form on the surface of the optical element, creating a risk of compromising optical characteristics such as transmittance. Such glasses are undesirable as optical glass compositions. Particularly when forming precision press molding preforms, when an alteration layer forms on the surface, precision press molding is negatively affected. Thus, when employed in the above applications, careful attention should be given to the weatherability of the glass. From this perspective, a haze value of equal to or less than 8 percent is preferable, equal to or less than 5 percent is more preferable, and equal to or less than 4 percent is of even greater preference.

To enhance the various above-described characteristics and improve the mass production property of the glass, the refractive index (nd) is preferably set to equal to or higher than 1.46, more preferably equal to or higher than 1.48, further preferably equal to or higher than 1.50, still more preferably equal to or higher than 1.52, still more preferably equal to or higher than 1.54, still more preferably equal to or higher than 1.55, and still more preferably equal to or higher than 1.56. The upper limit of the refractive index (nd) is preferably set to equal to or less than 1.7, more preferably set to equal to or less than 1.67, further preferably set to equal to or less than 1.65, still more preferably set to equal to or less than 1.63, still more preferably set to equal to or less than 1.62, still more preferably set to equal to or less than 1.61, and still more preferably set to equal to or less than 1.60.

The preferred composition ranges of the optical glass of the present invention will be described below. Details of the $P_2O_5$ content are as stated above, and the $P_2O_5$ content in the preferred composition ranges given below is limited to the range stated above. The quantity and total quantity of each component below, and the ratios of these quantities, unless specifically noted to suitably express a balance between $P_2O_5$ and the quantities of other components, are denoted as weight percentages or weight ratios.

The preferred composition range is:

$P_2O_5$: 18 to 70 percent, where 70 percent is excluded, as well as equal to or greater than 5 mole percent,;

$B_2O_3$: 0 to 34 percent, where 0 percent is excluded;

$Al_2O_3$: 0 to 8 percent;

$Li_2O$: 0 to 20 percent, where 0 percent is excluded;

$Na_2O$: 0 to 18 percent;

$K_2O$: 0 to 15 percent;

MgO: 0 to 25 percent;

CaO: 0 to 18 percent, where MgO+CaO>4 percent;

SrO: 0 to 20 percent;

BaO: 0 to 40 percent, where SrO+BaO>1 percent and $BaO/B_2O_3$, as a weight percentage ratio, is 0 to 15;

ZnO: 0 to 14 percent, where the ratio of Σ(sigma) R"O/Σ (sigma) R'O, as a weight percentage ratio, is equal to or less than 25, where ΣR-O=MgO+CaO+SrO+BaO+ZnO and ΣR'O=$Li_2O$+$Na_2O$+$K_2O$;

$Gd_2O_3$: 0 to 18 percent; and $Sb_2O_3$: 0 to 1 percent, wherein the content of the component contained in the largest quantity other than $P_2O_5$, $B_2O_3$, $Al_2O_3$, $Li_2O$, $Na_2O$, $K_2O$, MgO, CaO, SrO, BaO, ZnO, $Gd_2O_3$ and $Sb_2O_3$ is lower than the contents of both $B_2O_3$ and $Li_2O$.

Composition ranges of greater preference are divided into the two ranges as follows. In the first range, MgO is contained in a range of greater than 0 percent but equal to or less than 25 percent. In the second range, $B_2O_3$ is contained in a range of 0.6 to 34 percent and the ratio $P_2O_5/B_2O_3$ (weight percentage ratio) is 2.04 to 30.

In both the first and second ranges, the optical glasses comprise:

$P_2O_5$: 20 to 60 percent;

$B_2O_3$: 0.6 to 28 percent, where the ratio of $P_2O_5/B_2O_3$ (weight percentage ratio) is 2.1 to 30;

$Al_2O_3$: 0 to 8 percent;

$Li_2O$: 1 to 20 percent, where 1 percent is excluded;

$Na_2O$: 0 to 18 percent;

$K_2O$: 0 to 15 percent;

MgO: 0 to 25 percent, where 0 percent is excluded;

CaO: 0 to 18 percent, where MgO+CaO>4 percent;

SrO: 0 to 20 percent;

BaO: 0 to 39 percent, where SrO+BaO>1 percent, $BaO/B_2O_3$ (weight percentage ratio) is 0 to 15;

ZnO: 0 to 14 percent, where the ratio of ΣR"O/ΣR'O, as a weight percentage ratio, is equal to or less than 25, where ΣR"O=MgO+CaO+SrO+BaO+ZnO and ΣR'O=$Li_2O$+$Na_2O$+$K_2O$;

$Gd_2O_3$: 0 to 18 percent; and $Sb_2O_3$: 0 to 1 percent.

In each of the above compositions, the components $P_2O_5$, $B_2O_3$, and $Li_2O$, which work advantageously to lower dispersion, are present together. In addition, bivalent components are incorporated to enhance the weatherability of the glass. Of the bivalent components, BaO and SrO, with relatively large ionic radii, are advantageous to enhancing weatherability and devitrification stability and raising the refractive index. Thus, at least one bivalent component in the form of BaO or SrO is incorporated as an essential component along with $P_2O_5$, $B_2O_3$, and $Li_2O$.

The bivalent components arranged in order of the advantage afforded in terms of reducing dispersion are MgO, followed by CaO, SrO, BaO, and ZnO. Thus, allocating all the bivalent components to BaO and SrO is not suited to dispersion reduction. Accordingly, at least one from among MgO and CaO is incorporated as a bivalent component other than BaO and SrO to achieve dispersion reduction.

Among the bivalent components, MgO is advantageous to dispersion reduction. Thus, in the first range, the quantity of $B_2O_3$, one of components forming a mesh network structure of glass, can be determined more freely by incorporating MgO as an essential component. In the second range, the weight ratio of the contents of $P_2O_5$ and $B_2O_3$, that are components forming a mesh network structure of glass, is set to within a prescribed range, rendering MgO an optional component.

Among the other divalent components, ZnO is an optional component. To enhance devitrification stability, weatherability, solubility, and clarification effects and to adjust optical properties, $Al_2O_3$, $Na_2O$, $K_2O$, and $Gd_2O_3$ are incorporated as optional components. $Sb_2O_3$ can be incorporated as an optional clarifying agent.

In particular, to simultaneously achieve material characteristics such as low dispersion, good weatherability, and a higher refractive index, it is desirable to increase the thermal stability of the glass. Thus, in the present invention, various glass components are desirably employed in combination in the glass without the content of any single component becoming prominent. Incorporating a variety of glass components makes it possible to slow down the rate of precipitation of crystal seeds resulting from a single component, resulting in increased thermal stability of the glass and the simultaneous achievement of the various above-stated characteristics. Thus, in the above compositions, as will be described further below, as regards bivalent components, for example, the incorporation of at least a prescribed quantity of MgO and CaO is desirable with BaO and SrO.

The reasons for setting the above composition ranges will be described below.

$P_2O_5$, a component that forms a mesh network structure of the glass, is an essential component that maintains the stability for achieving glass manufacturability. However, when the content exceeds 70 percent, the glass transition temperature and sag temperature increase, causing the press molding temperature to rise, and decreasing the refractive index and weatherability. At less than 18 percent, the tendency of the glass to devitrif intensifies and the glass becomes unstable. Thus, the $P_2O_5$ content is set to 18 to 70 percent (excluding 70 percent, equal to or greater than 5 mole percent), preferably 20 to 60 percent, more preferably 24 to 58 percent, and still more preferably 28 to 54 percent. The significance of the relation between the preferred quantity of $P_2O_5$ based on the above-stated mole percentage and the content range based on the weight percentage is such that when one of the stated ranges is narrower than the range stated for the other, the present composition range yields a more desirable composition when the limit is set to the narrower range.

$B_2O_3$ is a component that extremely effectively enhances the melting properties and homogeneity of glass, as well as extremely effectively enhancing the durability of glass. However, when incorporated in excessive quantity, $B_2O_3$ causes the glass to lose its low dispersion property. Thus, the quantity incorporated is set to 0 to 34 percent (excluding 0 percent), and in the second range, to a range of 0.6 to 34 percent. In both the first and second ranges, the quantity of $B_2O_3$ incorporated is preferably 0.6 to 28 percent, more preferably more than 3 percent but equal to or less than 28 percent, further preferably more than 4 percent but equal to or less than 28 percent, and still more preferably more than 4 percent but equal to or less than 25 percent.

As mentioned above, in the first range, the quantity of $B_2O_3$, one of components forming a mesh network structure, can be determined more freely by incorporating MgO advantageous to dispersion reduction as an essential component. In the second range, the weight ratio of the contents of $P_2O_5$ and $B_2O_3$, that are components forming a mesh network structure of glass, is set to within a prescribed range, rendering MgO an optional component. That is, in the second range, to both impart low dispersion to the glass and suppress phase separation of the glass to obtain a uniform glass, within the above-stated ranges of the $P_2O_5$ and $B_2O_3$ contents, the ratio of the $P_2O_5$ content to the $B_2O_3$ content, $P_2O_5/B_2O_3$ (weight ratio), is set to from 2.04 to 30. $P_2O_5/B_2O_3$ is preferably 2.1 to 30, more preferably 2.1 to 25, and further preferably 2.2 to 15. By balancing the proportions of $P_2O_5$ and $B_2O_3$ in this manner, good weatherability, stability, and melting properties can be achieved while raising the refractive index and lowering dispersion. In the second range, the ratio $P_2O_5/B_2O_3$ (mole ratio) of the $P_2O_5$ content to the $B_2O_3$ content of the glass is preferably greater than 1 and less than 15, more preferably lower than 10, further preferably lower than 6, and still more preferably lower than 5.

In the first range, as described further below, MgO that is advantageous to dispersion reduction of glass is incorporated as an essential component. Thus, the $P_2O_5/B_2O_3$ (weight ratio) is not limited to 2.04 to 30. However, in the first range as well, $P_2O_5/B_2O_3$ (weight ratio) is preferably set to 2.04 to 30, more preferably 2.1 to 30, further preferably 2.1 to 25, and still more preferably 2.2 to 15.

$Al_2O_3$ is employed as a component that effectively enhances the weatherability of the glass. However, when incorporated in a quantity exceeding 8 percent, the glass transition temperature and sag temperature increase, glass stability and high-temperature melting properties deteriorate, and there is a risk of the refractive index decreasing. Thus, the quantity incorporated is set to 0 to 8 percent, preferably 0 to 6 percent, more preferably 0 to 5 percent.

$Li_2O$ is a component incorporated to lower the glass transition temperature, sag temperature, and press molding temperature. In particular, as set forth above, to lower the dispersion of the glass, it is extremely important to employ $P_2O_5$, $B_2O_3$, and $Li_2O$ in combination. However, when incorporated in excessively large quantity, glass weatherability, alkalinity resistance, and stability deteriorate and there is the risk of a sharp drop in refractive index. Thus, the quantity incorporated is set to a range of 0 to 20 percent (excluding 0 percent), preferably greater than 1 percent but equal to or less than 20 percent, more preferably 1.5 to 15 percent, still more preferably 1.0 to 10 percent, still more preferably 2.0 to 7 percent, and still more preferably greater than 2.5 percent but equal to or less than 7 percent.

$Na_2O$ and $K_2O$ are both optional components incorporated to increase the resistance to devitrification of the glass, to lower the glass transition temperature, sag temperature, and liquidus temperature, and to improve the high-temperature melting property of the glass. The incorporation of suitable quantities of $Na_2O$ ad $K_2O$ improves the stability of the glass and lowers the liquidus temperature and glass transition temperature. However, the incorporation of an excessive quantity not only compromises the stability of the glass, but also greatly reduces weatherability and alkalinity resistance and lowers the refractive index. Accordingly, in the glass of the present invention, the quantity of $Na_2O$ incorporated is set to within a range of 0 to 18 percent, preferably a range of 0 to 15 percent, more preferably a range of 0 to 10 percent, and still more preferably a range of 0 to 9 percent, and the quantity of $K_2O$ incorporated is set to within a range of 0 to 15 percent, preferably a range of 0 to 12 percent, more preferably a range of 0 to 4.5 percent, and still more preferably a range of 0 to 4 percent. The content of $Na_2O$ expressed as a mole percentage is preferably 0 to 9 mole percent, more preferably 0 to 7 mole percent. When $Li_2O+Na_2O+K_2O$ is less than 1 percent, the sag temperature of the glass rises and there is a risk of precluding good precision press molding. Thus, the total quantity of $Li_2O$, $Na_2O$ and $K_2O$ is preferably set to greater than 1 percent, more preferably greater than 1.5 percent, further preferably greater than 2 percent, and still more preferably greater than 2.5 percent. Incorporation of the alkali metal oxides such as $Li_2O$, $Na_2O$ and $K_2O$ lowers the liquidus temperature and improves the molding property of the glass melt, and is thus desirable from the perspective of hot molding preforms.

In the glass of the present invention, the incorporation of $Cs_2O$, an alkali metal oxide, is not necessarily required. Since such incorporation is undesirable from the perspective of the cost of starting materials, it is unnecessary. Further, since $Cs_2O$ greatly compromises weatherability, $Cs_2O$ is desirably not incorporated.

MgO, a component incorporated to achieve both good glass weatherability and low dispersion, is an essential component in the first range and an optional component in the second range. The incorporation of a small quantity of MgO has the effects of lowering the glass transition temperature, sag temperature, and liquidus temperature. However, the incorporation of a large quantity greatly compromises glass devitrification stability and presents a risk of raising the liquidus temperature. Thus, the quantity of MgO incorporated is set to a range of greater than 0 percent but equal to or less than 25 percent in the first range and to a range of 0 to 25 percent in the second range. The MgO content in both the first and second ranges is preferably 1 to 20 percent, more preferably 2 to 15 percent, and further preferably 3 to 12 percent. MgO works advantageously to lower the dispersion of the glass in the same manner as $B_2O_3$ and $Li_2O$. Thus, to achieve desired dispersion without losing various characteristics required for precision press molding and the hot molding of preforms, the incorporation of more than 4 percent of at least one component from among MgO, $B_2O_3$, and $Li_2O$ is desirable, with the incorporation of equal to or greater than 4.1 percent being preferred, and the incorporation of greater than 5 percent being desirable to impart low dispersion to the glass.

CaO is an optional component employed to improve the stability of the glass and lower the liquidus temperature. However, when an excessive quantity of CaO is incorporated, not only does the durability of the glass deteriorate, but there is a risk of a decrease in the refractive index. Thus, the quantity incorporated is set to a range of 0 to 18 percent, preferably a range of more than 4 percent but equal to or less than 15 percent, and more preferably a range of 4.5 to 12 percent.

In both the first and second ranges, within the above-stated ranges, the total quantity of MgO and CaO (MgO+CaO) is set so that the quantity of MgO and CaO incorporated is more than 4 percent, preferably equal to or greater than 5 percent, more preferably 7 to 25 percent, and further preferably 7 to 20 percent to achieve low dispersion and stability in the glass in addition to weatherability.

SrO is a component that effectively raises the refractive index of the glass without compromising the low dispersion of the glass. It is a component that is particularly effective at improving the weatherability of the glass. However, when incorporated in excessive quantity, SrO compromises the stability of the glass and raises the liquidus temperature. Accordingly, the quantity of SrO incorporated is set to a range of 0 to 20 percent, preferably 0 to 15 percent, and more preferably 0 to 10 percent.

BaO is a component that when incorporated in suitable quantity is extremely effective at increasing the refractive index of the glass and improving devitrification stability. In particular, it is the most effective component for improving the weatherability of the glass. However, when incorporated in excessive quantity, BaO has the drawbacks of greatly compromising the devitrification stability of the glass, increasing the glass transition temperature, and compromising low dispersion properties. Accordingly, the quantity incorporated is set to within a range of 0 to 40 percent, preferably 0 to 39 percent, and more preferably 1 to 38 percent. To improve the weatherability of the glass, within the above-stated range, the total quantity of SrO and BaO (SrO+BaO) is set so that the quantity of SrO and BaO incorporated is greater than 1 percent, preferably equal to or greater than 2 percent, more preferably, 3 to 40 percent.

From the perspective of enhancing the stability of the glass, the proportion of the total quantity of MgO and CaO (MgO+CaO) relative to the total quantity of SrO and BaO (SrO+BaO)—that is, (MgO+CaO)/(SrO+BaO) (weight ratio)—is preferably 0.11 to 40, more preferably 0.16 to 30, further preferably 0.2 to 25, and still more preferably 0.2 to 20, and still more preferably 0.2 to 10. There are also cases where this ratio is preferably 0.21 to 25 and more preferably 0.26 to 20. Thus, the contents of each component are preferably set within the above-stated ranges so as to further satisfy this weight ratio.

To lower the dispersion and increase the stability of the glass, the quantities of BaO and $B_2O_3$ are suitably set within the above-stated ranges so that the ratio (by weight) BaO/$B_2O_3$ of the BaO content to the $B_2O_3$ content falls within the range of 0 to 15, preferably a range of 0 to 12, and more preferably a range of 0 to 10.

ZnO is an optional component employed to improve the stability of the glass and lower the liquidus temperature. However, when incorporated in excessive quantity, ZnO not only compromises the durability of the glass, but also presents the risk of increasing dispersion. Accordingly, the quantity of ZnO incorporated is set within a range of 0 to 14 percent. To lower dispersion and further improve the stability of the glass, the quantity of ZnO incorporated is preferably set to 0 to 6 percent (excluding 6 percent), more preferably 0 to 5 percent, and further preferably 0 to 3 percent. ZnO is an optional component that is desirably not incorporated when attempting to lower dispersion.

To improve the durability of the glass and obtain desired optical characteristics, the total quantity of MgO, CaO, SrO, BaO, and ZnO (MgO+CaO+SrO+BaO+ZnO) is preferably set to equal to or greater than 10 percent, more preferably equal to or greater than 20 percent. Accordingly, the individual quantities of these components that are incorporated are desirably set both to satisfy the above-stated ranges and so that the total quantity of these components falls within the above-stated range.

To lower the temperature of precision press molding, the ratio (MgO+CaO+SrO+BaO+ZnO)/($Li_2O$+$Na_2O$+$K_2O$) (by weight) of the total quantity of MgO, CaO, SrO, BaO, and ZnO to the total quantity of $Li_2O$, $Na_2O$, and $K_2O$ is set to equal to or less than 25. The individual quantities incorporated of these components are set both within the above-stated ranges and so as to satisfy this weight ratio. This weight ratio is preferably less than 23, more preferably equal to or less than 22, and further preferably 2 to 20.

$Gd_2O_3$ is an optional component that can greatly improve the refractive index and weatherability of the glass. However, when incorporated in excessive quantity, $Gd_2O_3$ presents the risk of compromising the stability of the glass. Thus, the quantity incorporated is set to 0 to 18 percent, preferably 0 to 14 percent, and more preferably 0 to 10 percent.

$Sb_2O_3$ is effective as a glass clarifying agent. However, when added in a quantity exceeding 1 percent, bubbles tend to develop in the glass during precision press molding. Further, Sb exhibits a strong oxidizing power. Thus, when $Sb_2O_3$ is added in excessive quantity, the molding surfaces of the pressing mold tend to be damaged. Accordingly, the quantity of $Sb_2O_3$ incorporated is set at 0 to 1 percent, preferably 0 to 0.6 percent.

The above glass is desirably basically comprised of the components $P_2O_5$, $B_2O_3$, $Al_2O_3$, $Li_2O$, $Na_2O$, $K_2O$, MgO, CaO, SrO, BaO, ZnO, $Gd_2O_3$, and $Sb_2O_3$. The total quantity of components contained within the above-stated ranges preferably exceeds 95 percent, more preferably exceeds 98 percent, further preferably exceeds 99 percent, and still more preferably is 100 percent.

The above-described optical glass is basically comprised of the above-described components, but other components may also be incorporated. In that case, however, the content of the component contained in the largest quantity other than the above components is lower than the contents of both $B_2O_3$ and $Li_2O$.

For example, $Y_2O_3$ can be incorporated as a component capable of enhancing the weatherability and refractive index of the glass. However, since the incorporation of an excessive quantity of $Y_2O_3$ presents the risk of compromising the stability of the glass, the quantity of $Y_2O_3$ incorporated is desirably less than 1 percent even when each of $B_2O_3$ and $Li_2O$ is incorporated in a quantity of equal to or greater than 1 percent. When exercising caution not to decrease the stability of the glass, incorporation of $Y_2O_3$ is undesirable.

$SiO_2$ lowers the liquidus temperature of the glass and has the effect of increasing stability when incorporated in small quantity. Thus, it can be incorporated so long as the relation with the quantities of $B_2O_3$ and $Li_2O$ incorporated is satisfied. It can be incorporated in a quantity falling within the range of 0 to 2 percent, for example, with equal to or less than 1 percent being desirable and no incorporation being preferred.

$Nb_2O_5$ works to increase dispersion. Thus, even when $B_2O_3$ and $Li_2O$ are each incorporated in a quantity of equal to or greater than 2 percent, the quantity of $Nb_2O_5$ that is incorporated is preferably kept to less than 2 percent, more preferably equal to or less than 1 percent, and further preferably, none at all.

Further, one or more components selected from the group consisting of $Yb_2O_3$, $Lu_2O_3$, $ZrO_2$, $Ta_2O_5$, $Bi_2O_3$, $WO_3$, and $TiO_2$ can be incorporated within a range that does not compromise the objects of the present invention.

However, $La_2O_3$ is an unnecessary component which, when incorporated in small quantity, greatly compromises the stability of the glass and diminishes melting properties. It is thus desirably not incorporated. Further, SnO sharply increases the dispersion of the glass, and is thus desirably not incorporated.

The incorporation of various compounds of Te, Pb, Cd, Tl, and As is undesirable out of concern for their effects on the environment. Further, when precision press molding is conducted in a nonoxidizing or reducing environment, Ag compounds, which tend to precipitate out as metals due to reduction, are desirably not incorporated.

The incorporation of Nd, Er, Pr, and the like is unnecessary except when fabricating light-emitting elements. Further, the introduction of substances as light-emitting sources such as phosphorescence is undesirable when not for the purpose of fabricating light-emitting elements or the like.

The following three types of glass are given as examples of desirable ranges within the above-stated composition ranges based on targeted characteristics.

The first type of glass comprises 1 to 20 weight percent (excluding 20 weight percent) of BaO, preferably 1 to 18 weight percent. This smaller quantity yields lower dispersion and better weatherability. In the first type of glass, the quantity of $B_2O_3$ is preferably greater than 5 weight percent, more preferably equal to or greater than 7 weight percent. The quantity of MgO incorporated is preferably greater than 5 weight percent, more preferably equal to or greater than 6 weight percent.

The second type of glass comprises a relatively large quantity of BaO and sets the $P_2O_5$ content relative to the BaO content to a weight ratio ($P_2O_5$/BaO) of less than 1, thus achieving a higher refractive index and better weatherability. In the second type of glass, the $P_2O_5$ content is desirably set to less than 37 weight percent (less than 28 mole percent) and the BaO content to equal to or less than 40 weight percent, with a $P_2O_5$ content of equal to or less than 36 weight percent (equal to or less than 27 mole percent) and a BaO content of 20 weight percent to 38 weight percent being preferred.

The third type of glass incorporates a relatively large quantity of BaO and sets the weight ratio ($P_2O_5$/BaO) of the $P_2O_5$ content to the BaO content to equal to or greater than 1. By incorporating relatively more $P_2O_5$ than in the second type of glass, a higher refractive index and better weatherability and stability are achieved.

In the third type of glass, the $P_2O_5$ content is preferably set to less than 48 weight percent, more preferably less than 45 weight percent, further preferably less than 42 weight percent (less than 28 mole percent), with from 24 to 38 weight percent (18 to 27 mole percent) being of even greater preference. The BaO content is preferably set to less than 40 weight percent, more preferably from 20 to 38 weight percent. In the third type of glass, the content of ZnO is preferably set to less than 6 weight percent, more preferably equal to or less than 4 weight percent, and further preferably equal to or less than 2 weight percent. ZnO can be omitted to achieve a lower dispersion property.

As set forth above, depending on the characteristic being emphasized, any of the glasses of the first to third types may be selected.

Since all of the above optical glasses have good alkalinity resistance, the actualization of latent scratches and minute irregularities present on the surface of polished glass and precision press molded articles by cleaning of the glass can be inhibited, providing glass products with good surface properties that are clear and free of clouding. In particular, good weatherability can be achieved within the above composition ranges, making it possible to obtain glass products with surfaces that deteriorate little over extended periods.

[Liquidus Temperature and Viscosity at Liquidus Temperature]

One indicator of glass stability is the liquidus temperature. In the optical glass of the present invention, the liquidus temperature is preferably equal to or less than 950 degree Celsius, more preferably equal to or less than 940 degree Celsius, further preferably equal to or less than 930 degree Celsius, still more preferably equal to or less than 920 degree Celsius, still more preferably equal to or less than 910 degree Celsius, still more preferably equal to or less than 900 degree Celsius, still more preferably equal to or less than 890 degree Celsius, and still more preferably equal to or less than 880 degree Celsius.

When glass of such high stability is employed and a glass melt gob of the size necessary for forming one preform is separated from glass melt, a press molding preform can be molded without devitrification while the glass is at a temperature at or above its softening point. The composition can be suitably set within the above-described ranges to yield such a liquidus temperature.

From the perspective of providing optical glass suited to the above molding of a preform, the optical glass of the present invention desirably has a viscosity at the liquidus temperature falling within a range of 2 to 20 dPa·s.

[Method for Manufacturing Optical Glass]

The optical glass of the present invention can be manufactured by heating and melting glass starting materials. $P_2O_5$ starting materials in the form of $H_3PO_4$, metaphosphate, diphosphorus pentoxide, and the like; $B_2O_3$ starting materials in the form of $H_3BO_3$, $B_2O_3$, $BPO_4$, and the like; and other component starting materials in the form of carbonates, nitrates, oxides, and the like can be suitably employed. These starting materials are weighed out in prescribed proportions and mixed to form a starting material blend. This blend is then charged to a melting furnace that has been heated to 1,000 to 1,250 degree Celsius, for example, and melted, clarified, stirred, and homogenized to obtain uniform glass melt free of bubbles and unmelted material. The glass melt can be molded and gradually cooled to obtain the optical glass of the present invention.

A fluoride starting material is desirably employed to introduce fluorine into the glass and achieve lower dispersion.

To obtain such a low dispersion glass, the use of a fluorophosphate glass is desirable. However, when not seeking a glass of such low dispersion, it is desirable from the perspective of productivity not to introduce highly volatile fluorine, but to use instead phosphate glass to reduce striae caused by volatization.

[Precision Press Molding Preform and Method for Manufacturing Thereof]

The precision press molding preform and the method of manufacturing the same of the present invention will be described below.

A precision press molding preform can also be referred to as a preform for precision press molding, and is referred to hereinafter as the "preform".

A preform is a molded glass article of equal weight to a precision press molded article. The preform is formed to a shape suited to the shape of the precision press molded article. Examples of such shapes are spherical and spheroidal shapes. The preform is heated to impart a viscosity permitting precision press molding and supplied to precision press molding.

The preform of the present invention is comprised of the above-described optical glass, and as necessary, provided with a thin film such as a mold separation film on the surface thereof. The above-described preform can be precision press molded into an optical element of desired optical constants. Since it is comprised of glass of good weatherability, the surface of the preform tends not to deteriorate during storage. In precision press molding, the molding surfaces of the pressing mold are precisely transferred to mold the optically functional surfaces of an optical element without mechanical processing. If the surface of the preform that is subjected to precision press molding deteriorates and optically functional surfaces are transferred to the deteriorated surfaces, the deteriorated portion cannot be removed by mechanical processing following precision press molding. Thus, the optical element becomes a reject. However, with this preform, since the surfaces of preforms are maintained in a good state, such problems can be avoided. Further, since the preform has good weatherability, the weatherability of the optical element that is obtained by precision press molding from the preform is also good, making it possible to provide optical elements of high reliability over extended periods.

In the method for manufacturing a precision press molding preform of the present invention, glass melt of a prescribed weight is separated from glass melt flow flowing out from an outflow pipe to form a precision press molding preform comprised of the optical glass of the present invention. This is one method of manufacturing the preform of the present invention. A specific example is a method in which a glass melt gob of the above-described weight is separated from an outflowing glass melt flow and a preform having prescribed weight and comprised of the optical glass of the present invention is formed during cooling of the glass gob.

The above method is advantageous in that mechanical processing such as cutting, grinding, and polishing is unnecessary. Mechanically processed preforms require annealing prior to mechanical processing to reduce glass distortion to a degree at which damage does not occur. However, in the above-described method of manufacturing preforms, damage-preventing annealing is unnecessary. It is also possible to form preforms with smooth surfaces.

In the above-described method of manufacturing preforms, from the perspective of imparting smooth and clean surfaces, the preform is desirably formed in a floating state achieved by wind pressure. Further, preforms comprising free surfaces are desirable. Still further, preforms free of cutting marks known as shear marks are also desirable. Shear marks are produced when an outflowing glass melt is cut with a cutting blade. When shear marks remain at the stage where the preform has been molded into a precision press molded article, that portion is defective. Thus, shear marks are desirably eliminated at the preform stage. Methods of glass melt separation that do not produce shear marks and do not employ cutting blades include the method of dripping the glass melt from the outflow pipe, and the method of supporting the front portion of a glass melt flow flowing out from an outflow pipe and removing the support at a timing permitting the separation of a glass melt gob of prescribed weight (the drop-cut method). In the drop-cut method, the glass is separated at a constricted portion produced between the front end side of the glass melt flow and the outflow pipe side, making it possible to obtain a glass melt gob of prescribed weight. Next, while the glass melt gob that has been obtained is in a softened state, it is molded to a suitable shape for feeding in press molding.

In the above-described method of manufacturing preforms, a glass melt gob corresponding to a single preform is separated and the preform is formed while the glass gob is at a high temperature at or above the softening point of the glass. However, it is also possible to cause the glass melt to flow into a casting mold, mold a molded glass article comprised of the above-described optical glass, and mechanically process the molded glass article to obtain a preform of desired weight. The glass is desirably annealed prior to mechanical processing to adequately eliminate distortion so that the glass will not be damaged.

Preforms may be manufactured by a different method from those set forth above. In the second method for manufacturing a precision press molding preform, glass melt is caused to flow out and molded to obtain a glass molded article, and then the obtained glass molded article is mechanically processed to manufacture a precision press molding preform comprised of the optical glass of the present invention.

First, in the same manner as in the above-described methods, glass melt is prepared and caused to flow continuously out of a pipe and into a casting mold. Inside the casting mold, the glass melt is molded into a thick glass plate that is continuously drawn out in a horizontal direction. The glass being drawn out is continuously charged to a slow cooling furnace and annealed. Next, the glass can be cut, ground, and polished to obtain preforms of prescribed weight having smooth surfaces.

[Method for Manufacturing Optical Elements]

The optical element of the present invention is comprised of the optical glass of the present invention. The optical element of the present invention possesses the various above-described characteristics of the glass of which it is constituted. Thus, a high degree of reliability can be maintained over extended periods due to desired optical constants and good weatherability. Due to good alkalinity resistance in particular, the actualization of latent scratches by cleaning can be inhibited in both optical elements produced by polishing and optical elements produced by precision press molding, yielding optical elements that are clear and have good surface properties. The adhesion of coatings such as antireflective films can also be improved.

Examples of the optical element of the present invention are various types of lenses such as spherical lenses, aspherical lenses, and microlenses; diffraction gratings, lenses with diffraction gratings, lens arrays, and prisms. This optical element is desirably obtainable by heating and softening the preform of the present invention, followed by precision press molding.

As needed, optical thin films such as antireflective films, fully reflective films, partially reflective films, and films having spectroscopic characteristics can be provided on the optical element.

The method for manufacturing an optical element will be described below.

The method for manufacturing an optical element of the present invention is a method comprising heating the preform of the present invention or a preform manufactured by the method for manufacturing a preform of the present invention and precision press molding said heated preform with a pressing mold.

Precision press molding is also called mold optics molding, and is already well known in the field of art to which the present invention belongs. A surface that transmits, refracts, diffracts, or reflects a light ray of an optical element is known as an optically functional surface. Taking the example of a lens, the aspherical surface of an aspherical lens and the spherical surface of a spherical lens correspond to optically functional surfaces. In precision press molding, the molding surface of the press mold is precisely transferred to the glass to mold an optically functional surface by press molding. That is, there is no need to conduct mechanical processing such as grinding or polishing to finish the optically functional surface. Accordingly, the method for manufacturing an optical element of the present invention is suited to the manufacturing of optical elements such as lenses, lens arrays, diffraction gratings, and prisms, and is optimal for the manufacturing of aspherical lenses with high production efficiency.

The method for manufacturing an optical element of the present invention permits the manufacturing of optical elements having the above-stated optical characteristics. Since the glass transition temperature (Tg) of the glass comprising the preform is low, the press molding of glass can be conducted at relatively low temperature, lightening the load to which the molding surfaces of the pressing mold are subjected and thus extending the service lifetime of the pressing mold. Since the glass comprising the preform is highly stable, devitrification of the glass is effectively prevented in the reheating and pressing steps. Further, a series of high productivity steps can be conducted from melting the glass to obtaining the final product.

In contrast to manufacturing optical elements by the polishing method, optical elements with few latent scratches causing the deterioration of surface properties during cleaning can be manufactured. Thus, in addition to a good alkalinity resistance of the glass, according to the above method, it is possible to manufacture optical elements with surface properties that tend not to deteriorate due to cleaning.

Further, due to the good thermal stability of the glass, it is possible to manufacture optical elements without causing devitrification of the glass, making it possible to provide optical elements that are highly reliable over extended periods due to good weatherability and alkalinity resistance.

A known pressing mold may be employed, such as a pressing mold comprised of a mold material such as silicon carbide, an ultrahard material, or stainless steel with molding surfaces coated with a mold separation film. A mold separation film in the form of a carbon-containing film, precious metal alloy film, or the like may be employed. The pressing mold comprises upper and lower molds and a sleeve mold if necessary.

In precision press molding, a non-oxidizing gas atmosphere is desirably employed during molding to keep the molding surface of the pressing mold in good condition. Nitrogen and mixed gases of nitrogen and hydrogen are desirable as the non-oxidizing gas.

Precision press molding methods particularly suited to the method of manufacturing optical elements of the present invention will be described below.

(Precision Press Molding Method 1)

In this method (referred to as precision press molding method 1), a preform is introduced into a press mold, the press mold and preform are heated together, and then precision press molding is conducted.

In precision press molding method 1, both the press mold and preform are desirably heated to a temperature at which the glass constituting the preform exhibits a viscosity of $10^6$ to $10^{12}$ dPa·s and precision press molding is conducted.

After cooling the glass to a temperature at which it exhibits a viscosity of equal to or greater than $10^{12}$ dPa·s, preferably equal to or greater than $10^{14}$ dPa·s, and more preferably equal to or greater than $10^{16}$ dPa·s, the precision press molded article is desirably removed from the press mold.

Based on the above conditions, it is both possible to more precisely transfer the shape of the molding surface of the press mold to the glass and to remove the precision press molded article without deformation.

(Precision Press Molding Method 2)

This method is characterized in that a preform that has been preheated is introduced into a pressing mold and then precision press molded (referred to hereinafter as "precision press molding method 2"). In this method, it is preferable that a preform that has been preheated separately from a pressing mold is introduced into a preheated pressing mold and then precision press molded.

According to this method, since the preform is preheated before being introduced into the pressing mold, the cycle time can be shortened and optical elements with good surface precision and no surface defects can be manufactured.

The pressing mold is desirably preheated to a temperature lower than that to which the preform is preheated. Such preheating makes it possible to keep the preheating temperature of the pressing mold low, reducing wear and tear on the pressing mold.

In precision press molding method 2, preheating of the preform is preferably conducted to a temperature at which the glass constituting the preform exhibits a viscosity of equal to or less than $10^9$ dPa·s, more preferably $10^9$ dPa·s.

Further, preheating is preferably conducted while floating the above-described preform, it being desirable for preheating to be conducted to a temperature at which the glass constituting the preform exhibits a viscosity of $10^{5.5}$ to $10^9$ dPa·s, more preferably equal to or greater than $10^{5.5}$ and less than $10^9$ dPa·s.

Cooling of the glass is desirably begun either simultaneously with the start of pressing or during pressing.

The temperature of the pressing mold is preferably adjusted to be lower than the temperature to which the preform is preheated; a temperature at which the glass exhibits a viscosity of $10^9$ to $10^{12}$ dPa·s can be used as a yardstick.

In this method, following press molding, removal from the mold is desirably conducted after cooling to a temperature at which the glass exhibits a viscosity of equal to or greater than $10^{12}$ dPa·s.

The precision press molded optical element is removed from the press mold and gradually cooled as needed. When the molded article is an optical element such as a lens, the surface thereof can be coated with an optical thin film as needed.

EXAMPLES

The present invention will be described in detail below based on examples. However, the present invention is not limited to the examples.

Examples 1 to 21

Table 1 shows the glass compositions, refractive indexes (nd), Abbé numbers (vd), glass transition temperatures (Tg), sag temperatures (Ts), liquidus temperatures (L.T.), specific gravities, haze values (a weatherability indicator), and amount of weight reduction of the glass when immersed in an aqueous solution of sodium hydroxide (an indicator of alkalinity resistance) of the various Examples. In all of these glasses, various oxides, hydroxides, carbonates, and nitrates corresponding to the various components were employed as starting materials. These starting materials were weighed out in such a manner as to yield the compositions shown in Table 1 following vitrification, thoroughly mixed, charged to a platinum crucible, melted in an electric furnace in a temperature range of 1,050 to 1,200 degree Celsius, homogenized by stirring, clarified, and cast into a metal mold that had been preheated to suitable temperature. The cast glass was then cooled to the glass transition temperature, immediately charged to an annealing furnace, and gradually cooled to room temperature to obtain the various optical glasses.

The refractive index (nd), Abbé number (vd), glass transition temperature (Tg), sag temperature (Ts), liquidus temperature (L.T.), viscosity of the glass at the liquidus temperature (L.T. viscosity), haze value, specific gravity, and amount of weight reduction of each of the optical glasses obtained were measured as follows.

(1) Refractive Index (nd) and Abbé Number (vd)

Measured for optical glass obtained at a gradual cooling rate of 30 degree Celsius/hour.

(2) Glass Transition Temperature (Tg) and Sag Temperature (Ts)

Measured at a heating rate of 4 degree Celsius/minute with a thermomechanical analyzer from Rigaku Denki K.K.

(3) Liquidus Temperature (L. T.)

Glass samples of about 50 g were charged to a platinum crucible; melted for about 15 to 60 minutes at about 1,100 to 1,200 degree Celsius; maintained for two hours at 860 degree Celsius, 870 degree Celsius, 880 degree Celsius, 890 degree Celsius, 900 degree Celsius, 910 degree Celsius, 920 degree Celsius, 930 degree Celsius, 940 degree Celsius, 950 degree Celsius, or 960 degree Celsius; and cooled. A microscope was then used to observe whether or not crystals had precipitated. The lowest temperature at which no crystals were found was adopted as the liquidus temperature (L.T.).

(4) Viscosity at Liquidus Temperature (L.T. Viscosity)

The viscosity was measured by the viscosity measurement method of JIS standard Z8803 using a twin-screw double circular cylinder-type rotating viscometer.

(5) Haze Value

The ratio, expressed as a percentage, of scattered light intensity to transmitted light intensity (scattered light intensity/transmitted light intensity) when glass that has been optically polished on both surfaces is kept for one week in a clean thermo-hygrostat at a temperature of 65 degree Celsius and a humidity of 90 percent and white light is caused to pass perpendicularly through the glass in a direction perpendicular to the polished surfaces thereof.

(6) Specific Gravity

Calculated by Archimedes' method.

(7) Surface Crystallization, Internal Crystallization

Molten glass was cast into a casting mold in air, a molded glass article having a flat free surface on top was produced, and this molded glass article was cut, yielding rectangular parallelepiped glass samples measuring 1×1×2 cm$^3$. The molded glass article was cut so that one of the surfaces of the sample (1×2 cm$^2$) was part of the free surface. The glass sample was heated at a rate of 30 degree Celsius/minute to 610 degree Celsius, maintained at that temperature for 10 minutes, and then stood to cool (heat treatment A). The glass was then observed by microscope under magnification and the number of crystal particles with a diameter of equal to or greater than 100 nm present in the glass was counted. Observation by microscope under magnification was then used to determine the average density of crystal particles of a diameter of equal to or greater than 0.1 micrometer that had precipitated on the free surface of the glass following heat treatment A.

(8) Alkalinity Resistance

The glass surface was optically polished, the glass was immersed in a 0.01 mole/liter NaOH aqueous solution at 50 degree Celsius, and the amount of loss in weight per unit area per unit time was calculated.

The glasses of Examples 1 to 21 were low dispersion glasses with an Abbé number (vd) of greater than 59 but less than 70 that exhibited high refractive indexes. These glasses, with glass transition temperatures of equal to or less than 530 degree Celsius and sag temperatures of equal to or less than 570 degree Celsius, had good low temperature softening properties. Each of these glasses also had a viscosity at the liquidus temperature that was suited to the molding of preforms. Further, these glasses had low haze values, good weatherability, and good alkalinity resistance. They exhibited no internal crystallization and extremely little surface crystallization, and had good devitrification stability. No coloration was observed visually in any of the glasses.

TABLE 1

| | | Example No. | | | | | |
|---|---|---|---|---|---|---|---|
| | | 1 | | 2 | | 3 | |
| | | mol % | wt % | mol % | wt % | mol % | wt % |
| Composition | $P_2O_5$ | 27.50 | 37.78 | 30.00 | 44.96 | 30.00 | 46.40 |
| | $B_2O_3$ | 6.50 | 4.38 | 6.50 | 4.78 | 12.50 | 9.48 |
| | $Al_2O_3$ | 3.50 | 3.45 | 3.50 | 3.77 | 2.50 | 2.78 |
| | $Li_2O$ | 12.50 | 3.61 | 13.00 | 4.10 | 12.50 | 4.07 |
| | $Na_2O$ | 0.00 | 0.00 | 0.00 | 0.00 | 0.00 | 0.00 |
| | $K_2O$ | 0.00 | 0.00 | 0.00 | 0.00 | 0.00 | 0.00 |
| | MgO | 12.50 | 4.88 | 14.50 | 6.17 | 14.00 | 6.15 |
| | CaO | 12.50 | 6.78 | 14.50 | 8.59 | 12.50 | 7.64 |
| | SrO | 0.00 | 0.00 | 0.00 | 0.00 | 6.00 | 6.77 |
| | BaO | 24.00 | 35.61 | 16.00 | 25.91 | 10.00 | 16.71 |
| | ZnO | 0.00 | 0.00 | 2.00 | 1.72 | 0.00 | 0.00 |
| | $Gd_2O_3$ | 1.00 | 3.51 | 0.00 | 0.00 | 0.00 | 0.00 |
| | Total | 100.00 | 100.00 | 100.00 | 100.00 | 100.00 | 100.00 |
| | $P_2O_5/B_2O_3$ | 4.2 | 8.6 | 4.6 | 9.4 | 2.4 | 4.9 |
| | $BaO/B_2O_3$ | 3.7 | 8.1 | 2.5 | 5.4 | 0.8 | 1.8 |
| | MgO + CaO | 25.0 | 11.7 | 29.0 | 14.8 | 26.5 | 13.8 |
| | SrO + BaO | 24.0 | 35.6 | 16.0 | 25.9 | 16.0 | 23.5 |
| | (MgO + CaO)/(SrO + BaO) | 1.04 | 0.33 | 1.81 | 0.57 | 1.66 | 0.59 |
| | ΣR"O/ΣR'O | 3.9 | 13.1 | 3.6 | 10.3 | 3.4 | 9.2 |

TABLE 1-continued

| Characteristics | | | | |
|---|---|---|---|---|
| Tg [°C] | 510 | 490 | 501 |
| Ts [°C] | 558 | 533 | 541 |
| L.T. [°C] | 880 | 870 | 930 |
| L.T. viscosity | 12 | 8 | 6 |
| Specific gravity [g/cm$^3$] | 3.58 | 3.28 | 3.13 |
| Nd | 1.6197 | 1.6018 | 1.5925 |
| νd | 64.0 | 65.8 | 67.4 |
| Number of surface crystal per cm$^2$ | <1000 | <100 | <1000 |
| Internal crystal | Not observed | Not observed | Not observed |
| HAZE [%] | 0.4 | 0.2 | 0.3 |
| Weight reduction [μg/cm$^2$·h] | 1.8 | 5.3 | 7.1 |

| | | Example No. 4 | | Example No. 5 | | Example No. 6 | |
|---|---|---|---|---|---|---|---|
| | | mol % | wt % | mol % | wt % | mol % | wt % |
| Composition | P$_2$O$_5$ | 25.00 | 32.06 | 25.00 | 35.24 | 30.00 | 41.20 |
| | B$_2$O$_3$ | 7.50 | 4.72 | 7.50 | 5.19 | 6.50 | 4.38 |
| | Al$_2$O$_3$ | 2.50 | 2.30 | 2.50 | 2.53 | 3.50 | 3.45 |
| | Li$_2$O | 7.50 | 2.03 | 10.00 | 2.97 | 12.50 | 3.61 |
| | Na$_2$O | 0.00 | 0.00 | 0.00 | 0.00 | 0.00 | 0.00 |
| | K$_2$O | 0.00 | 0.00 | 0.00 | 0.00 | 0.00 | 0.00 |
| | MgO | 10.00 | 3.64 | 12.50 | 5.00 | 10.50 | 4.09 |
| | CaO | 10.00 | 5.07 | 12.50 | 6.96 | 10.50 | 5.70 |
| | SrO | 0.00 | 0.00 | 0.00 | 0.00 | 0.00 | 0.00 |
| | BaO | 25.00 | 34.64 | 25.00 | 38.07 | 24.00 | 35.60 |
| | ZnO | 10.00 | 7.35 | 5.00 | 4.04 | 2.50 | 1.97 |
| | Gd$_2$O$_3$ | 2.50 | 8.19 | 0.00 | 0.00 | 0.00 | 0.00 |
| | Total | 100.00 | 100.00 | 100.00 | 100.00 | 100.00 | 100.00 |
| | P$_2$O$_5$/B$_2$O$_3$ | 3.3 | 6.8 | 3.3 | 6.8 | 4.6 | 9.4 |
| | BaO/B$_2$O$_3$ | 3.3 | 7.3 | 3.3 | 7.3 | 3.7 | 8.1 |
| | MgO + CaO | 20.0 | 8.7 | 25.0 | 12.0 | 21.0 | 9.8 |
| | SrO + BaO | 25.0 | 34.6 | 25.0 | 38.1 | 24.0 | 35.6 |
| | (MgO + CaO)/(SrO + BaO) | 0.80 | 0.25 | 1.00 | 0.31 | 0.88 | 0.28 |
| | ΣR"O/ΣR'O | 7.3 | 25.0 | 5.5 | 18.2 | 3.8 | 13.1 |
| Characteristics | Tg [°C] | 528 | | 514 | | 495 | |
| | Ts [°C] | 574 | | 559 | | 535 | |
| | L.T. [°C] | 950 | | 900 | | 880 | |
| | L.T. viscosity | 5 | | 8 | | 9 | |
| | Specific gravity [g/cm$^3$] | 3.88 | | 3.63 | | 3.49 | |
| | Nd | 1.6415 | | 1.6242 | | 1.6096 | |
| | νd | 60.5 | | 62.5 | | 64.9 | |
| | Number of surface crystal per cm$^2$ | <100000 | | <100000 | | <100000 | |
| | Internal crystal | Not observed | | Not observed | | Not observed | |
| | HAZE [%] | 0.3 | | 0.3 | | 0.2 | |
| | Weight reduction [μg/cm$^2$·h] | 0.8 | | 2.7 | | 5.4 | |

| | | Example No. 7 | | Example No. 8 | | Example No. 9 | |
|---|---|---|---|---|---|---|---|
| | | mol % | wt % | mol % | wt % | mol % | wt % |
| Composition | P$_2$O$_5$ | 27.50 | 47.08 | 30.00 | 43.20 | 30.00 | 45.47 |
| | B$_2$O$_3$ | 20.00 | 16.80 | 7.50 | 5.30 | 6.50 | 4.83 |
| | Al$_2$O$_3$ | 2.50 | 3.08 | 2.50 | 2.59 | 3.50 | 3.81 |
| | Li$_2$O | 10.00 | 3.61 | 13.00 | 3.94 | 13.00 | 4.15 |
| | Na$_2$O | 2.50 | 1.87 | 0.00 | 0.00 | 0.00 | 0.00 |
| | K$_2$O | 2.50 | 2.84 | 0.00 | 0.00 | 0.00 | 0.00 |
| | MgO | 17.50 | 8.51 | 12.50 | 5.11 | 15.00 | 6.46 |
| | CaO | 12.50 | 8.46 | 12.50 | 7.11 | 15.00 | 8.98 |
| | SrO | 2.50 | 3.13 | 0.00 | 0.00 | 0.00 | 0.00 |
| | BaO | 2.50 | 4.62 | 20.00 | 31.10 | 15.00 | 24.56 |
| | ZnO | 0.00 | 0.00 | 2.00 | 1.65 | 2.00 | 1.74 |
| | Gd$_2$O$_3$ | 0.00 | 0.00 | 0.00 | 0.00 | 0.00 | 0.00 |
| | Total | 100.00 | 100.00 | 100.00 | 100.00 | 100.00 | 100.00 |
| | P$_2$O$_5$/B$_2$O$_3$ | 1.4 | 2.8 | 4.0 | 8.2 | 4.6 | 9.4 |
| | BaO/B$_2$O$_3$ | 0.1 | 0.3 | 2.7 | 5.9 | 2.3 | 5.1 |
| | MgO + CaO | 30.0 | 17.0 | 25.0 | 12.2 | 30.0 | 15.4 |
| | SrO + BaO | 5.0 | 7.8 | 20.0 | 31.1 | 15.0 | 24.6 |
| | (MgO + CaO)/(SrO + BaO) | 6.00 | 2.19 | 1.25 | 0.39 | 2.00 | 0.63 |
| | ΣR"O/ΣR'O | 2.3 | 3.0 | 3.6 | 11.4 | 3.6 | 10.1 |

TABLE 1-continued

| Characteristics | | | | |
|---|---|---|---|---|
| Tg[° C.] | 484 | 488 | 489 |
| Ts[° C.] | 528 | 531 | 532 |
| L.T.[° C.] | 900 | 880 | 870 |
| L.T.viscosity | 9 | 8 | 9 |
| Specific gravity[g/cm³] | 2.80 | 3.38 | 3.26 |
| Nd | 1.5656 | 1.6047 | 1.6005 |
| νd | 67.9 | 65.5 | 65.8 |
| Number of surface crystal per cm² | <100 | <1000 | <100 |
| Internal crystal | Not observed | Not observed | Not observed |
| HAZE[%] | 0.9 | 0.3 | 0.3 |
| Weight reduction [μg/cm²·h] | 9.1 | 5.0 | 4.4 |

| | | Example No. | | | | |
|---|---|---|---|---|---|---|
| | | 10 | | 11 | | 12 | |
| | | mol % | wt % | mol % | wt % | mol % | wt % |
| Composition | P₂O₅ | 30.00 | 47.51 | 30.00 | 40.58 | 30.00 | 40.41 |
| | B₂O₃ | 12.50 | 9.71 | 7.50 | 4.98 | 7.50 | 4.96 |
| | Al₂O₃ | 2.50 | 2.84 | 2.50 | 2.43 | 2.50 | 2.42 |
| | Li₂O | 15.00 | 5.00 | 12.50 | 3.56 | 10.00 | 2.84 |
| | Na₂O | 0.00 | 0.00 | 0.00 | 0.00 | 0.00 | 0.00 |
| | K₂O | 0.00 | 0.00 | 0.00 | 0.00 | 0.00 | 0.00 |
| | MgO | 12.50 | 5.62 | 8.75 | 3.36 | 10.00 | 3.82 |
| | CaO | 12.50 | 7.82 | 8.75 | 4.68 | 10.00 | 5.32 |
| | SrO | 7.50 | 8.67 | 0.00 | 0.00 | 0.00 | 0.00 |
| | BaO | 7.50 | 12.83 | 25.00 | 36.53 | 25.00 | 36.37 |
| | ZnO | 0.00 | 0.00 | 5.00 | 3.88 | 5.00 | 3.86 |
| | Gd₂O₃ | 0.00 | 0.00 | 0.00 | 0.00 | 0.00 | 0.00 |
| | Total | 100.00 | 100.00 | 100.00 | 100.00 | 100.00 | 100.00 |
| | P₂O₅/B₂O₃ | 2.4 | 4.9 | 4.0 | 8.1 | 4.0 | 8.1 |
| | BaO/B₂O₃ | 0.6 | 1.3 | 3.3 | 7.3 | 3.3 | 7.3 |
| | MgO + CaO | 25.0 | 13.4 | 17.5 | 8.0 | 20.0 | 9.1 |
| | SrO + BaO | 15.0 | 21.5 | 25.0 | 36.5 | 25.0 | 36.4 |
| | (MgO + CaO)/(SrO+BaO) | 1.67 | 0.63 | 0.70 | 0.22 | 0.80 | 0.25 |
| | ΣR"O/ΣR'O | 2.7 | 7.0 | 3.8 | 13.6 | 5.0 | 17.4 |
| Characteristics | Tg[° C.] | 492 | | 485 | | 500 | |
| | Ts[° C.] | 534 | | 528 | | 541 | |
| | L.T.[° C.] | 940 | | 900 | | 900 | |
| | L.T.viscosity | 5 | | 6 | | 9 | |
| | Specific gravity[g/cm³] | 3.09 | | 3.54 | | 3.55 | |
| | Nd | 1.5899 | | 1.6116 | | 1.6129 | |
| | νd | 67.5 | | 64.5 | | 64.2 | |
| | Number of surface crystal per cm² | <1000 | | <100000 | | <100000 | |
| | Internal crystal | Not observed | | Not observed | | Not observed | |
| | HAZE[%] | 0.4 | | 0.3 | | 0.2 | |
| | Weight reduction[μg/cm²·h] | 10.0 | | 5.6 | | 4.1 | |

| | | Example No. | | | | | |
|---|---|---|---|---|---|---|---|
| | | 13 | | 14 | | 15 | |
| | | mol % | wt % | mol % | wt % | mol % | wt % |
| Composition | P₂O₅ | 32.50 | 52.90 | 27.50 | 48.03 | 32.50 | 51.96 |
| | B₂O₃ | 15.00 | 11.98 | 20.00 | 17.13 | 15.00 | 11.76 |
| | Al₂O₃ | 4.00 | 4.68 | 2.50 | 3.14 | 2.50 | 2.87 |
| | Li₂O | 10.00 | 3.43 | 15.00 | 5.52 | 10.00 | 3.37 |
| | Na₂O | 2.50 | 1.78 | 0.00 | 0.00 | 0.00 | 0.00 |
| | K₂O | 2.50 | 2.70 | 0.00 | 0.00 | 2.50 | 2.65 |
| | MgO | 17.50 | 8.09 | 20.00 | 9.92 | 17.50 | 7.94 |
| | CaO | 11.00 | 7.07 | 7.50 | 5.17 | 12.50 | 7.90 |
| | SrO | 2.50 | 2.97 | 5.00 | 6.37 | 2.50 | 2.92 |
| | BaO | 2.50 | 4.40 | 2.50 | 4.72 | 5.00 | 8.63 |
| | ZnO | 0.00 | 0.00 | 0.00 | 0.00 | 0.00 | 0.00 |
| | Gd₂O₃ | 0.00 | 0.00 | 0.00 | 0.00 | 0.00 | 0.00 |
| | Total | 100.00 | 100.00 | 100.00 | 100.00 | 100.00 | 100.00 |
| | P₂O₅/B₂O₃ | 2.2 | 4.4 | 1.4 | 2.8 | 2.2 | 4.4 |
| | BaO/B₂O₃ | 0.2 | 0.4 | 0.1 | 0.3 | 0.3 | 0.7 |
| | MgO + CaO | 28.5 | 15.2 | 27.5 | 15.1 | 30.0 | 15.8 |
| | SrO + BaO | 5.0 | 7.4 | 7.5 | 11.1 | 7.5 | 11.6 |
| | (MgO + CaO)/(SrO + BaO) | 5.70 | 2.06 | 3.67 | 1.36 | 4.00 | 1.37 |
| | ΣR"O/ΣR'O | 2.2 | 2.8 | 2.3 | 4.7 | 3.0 | 4.5 |

TABLE 1-continued

| Characteristics | | | | |
|---|---|---|---|---|
| Tg[° C.] | 485 | 495 | 502 | |
| Ts[° C.] | 526 | 538 | 544 | |
| L.T.[° C.] | 950 | 930 | 930 | |
| L.T.viscosity | 7 | 5 | 9 | |
| Specific gravity[g/cm$^3$] | 2.80 | 2.84 | 2.89 | |
| Nd | 1.5638 | 1.5736 | 1.5699 | |
| νd | 68.4 | 68.0 | 68.3 | |
| Number of surface crystal per cm$^2$ | <1000 | <10000 | <1000 | |
| Internal crystal | Not observed | Not observed | Not observed | |
| HAZE[%] | 1.3 | 14 | 1 | |
| Weight reduction[μg/cm$^2$ · h] | 16.3 | 15.4 | 13.3 | |

| | | Example No. | | | | |
|---|---|---|---|---|---|---|
| | | 16 | | 17 | | 18 |
| | | mol % | wt % | mol % | wt % | mol % | wt % |
| Composition | P$_2$O$_5$ | 30.00 | 49.88 | 27.50 | 38.05 | 30.00 | 45.44 |
| | B$_2$O$_3$ | 17.50 | 14.27 | 7.50 | 5.09 | 15.00 | 11.14 |
| | Al$_2$O$_3$ | 2.50 | 2.99 | 2.50 | 2.48 | 2.50 | 2.72 |
| | Li$_2$O | 12.50 | 4.38 | 12.50 | 3.64 | 10.00 | 3.19 |
| | Na$_2$O | 0.00 | 0.00 | 0.00 | 0.00 | 0.00 | 0.00 |
| | K$_2$O | 0.00 | 0.00 | 0.00 | 0.00 | 0.00 | 0.00 |
| | MgO | 17.50 | 8.26 | 10.00 | 3.93 | 12.50 | 5.38 |
| | CaO | 12.50 | 8.21 | 10.00 | 5.47 | 12.50 | 7.48 |
| | SrO | 2.50 | 3.03 | 0.00 | 0.00 | 7.50 | 8.29 |
| | BaO | 5.00 | 8.98 | 25.00 | 37.37 | 10.00 | 16.36 |
| | ZnO | 0.00 | 0.00 | 5.00 | 3.97 | 0.00 | 0.00 |
| | Gd$_2$O$_3$ | 0.00 | 0.00 | 0.00 | 0.00 | 0.00 | 0.00 |
| | Total | 100.00 | 100.00 | 100.00 | 100.00 | 100.00 | 100.00 |
| | P$_2$O$_5$/B$_2$O$_3$ | 1.7 | 3.5 | 3.7 | 7.5 | 2.0 | 4.1 |
| | BaO/B$_2$O$_3$ | 0.3 | 0.6 | 3.3 | 7.3 | 0.7 | 1.5 |
| | MgO + CaO | 30.0 | 16.5 | 20.0 | 9.4 | 25.0 | 12.9 |
| | SrO + BaO | 7.5 | 12.0 | 25.0 | 37.4 | 17.5 | 24.7 |
| | (MgO + CaO)/(SrO + BaO) | 4.00 | 1.37 | 0.80 | 0.25 | 1.43 | 0.52 |
| | ΣR"O/ΣR'O | 3.0 | 6.5 | 4.0 | 13.9 | 4.3 | 11.8 |
| Characteristics | Tg[° C.] | 501 | | 490 | | 519 | |
| | Ts[° C.] | 540 | | 532 | | 562 | |
| | L.T.[° C.] | 910 | | 900 | | 950 | |
| | L.T.viscosity | 7 | | 6 | | 5 | |
| | Specific gravity[g/cm$^3$] | 2.90 | | 3.58 | | 3.16 | |
| | Nd | 1.5781 | | 1.6171 | | 1.5923 | |
| | νd | 68.0 | | 63.7 | | 67.4 | |
| | Number of surface crystal per cm$^2$ | <10000 | | <100000 | | <1000 | |
| | Internal crystal | Not observed | | Not observed | | Not observed | |
| | HAZE[%] | 1 | | 0.2 | | 0.3 | |
| | Weight reduction[μg/cm$^2$ · h] | 9.1 | | 3.6 | | 5.6 | |

Example 22

Clarified and homogenized glass melts corresponding to Examples 1 to 21 were caused to flow at a constant rate out of a platinum-alloy pipe the temperature of which had been adjusted to within a range permitting stable outflow without devitrification of the glass. Dripping or the drop-cut method was employed to separate a glass melt gob with the weight of a preform to be formed. The glass melt gob was received by a receiving mold having gas blow holes in the bottom. The glass gob was formed into a precision press molding preform while blowing gas through the blow holes to float the glass gob. The separation timing of the glass melt was adjusted and set to obtain spherical preforms 2 to 30 mm in diameter. The weight of the preforms precisely matched the design value, and all preforms had smooth surfaces.

Example 23

The preforms obtained in Example 22 were precision press molded using the pressing device shown in FIG. 1, yielding aspherical lenses. Specifically, preform 4 was set between lower mold 2 and upper mold 1 comprising the pressing mold, the interior of quartz tube 11 was backfilled with a nitrogen atmosphere, heater 12 was turned on, and the interior of quartz tube 11 was heated. The temperature of the interior of the pressing mold was set to a temperature at which the glass being molded exhibited a viscosity of $10^8$ to $10^{10}$ dPa·s. While maintaining this temperature, pressing rod 13 was lowered to apply pressure to upper mold 1, thereby pressing the preform that had been set in the pressing mold. In FIG. 1, sleeve mold 3, also referred to as a "drum mold," functioned to restrict expansion of the glass while determining the relative positions of molds 1 and 2. Support rod 9 functioned to receive the pressure applied by pressing rod 13. Pressing mold holder 10 functioned to hold the pressing mold. Thermocouple 14 functioned to monitor the temperature of lower mold 2. The pressing pressure was 8 MPa and the pressing time was 30 s. Following pressing, the pressure was removed and the molded glass article that had been press molded was gradually cooled to a temperature at which the above glass exhibited a viscosity of equal to or more than $10^{12}$ dPa·s while contacting with lower mold 2 and upper mold 1. Next, the molded glass article was rapidly cooled to room temperature and removed from the pressing mold, yielding an aspherical lens. The aspherical lens obtained had extremely high surface precision.

Aspherical lenses thus obtained were cleaned with cleaning solution, thoroughly rinsed, and dried, yielding clean lenses. Observation of these lenses revealed no surface clouding and no defects such as striae or devitrification in the interior of the glass.

An antireflective film may be provided as needed on the surface of a cleaned aspherical lens.

Example 24

Preforms obtained in Example 22 were preheated to a temperature at which the glass constituting the preforms exhibited a viscosity of $10^8$ dPa·s while being floated. A pressing mold equipped with an upper mold, a lower mold, and a sleeve mold was heated to a temperature at which the above glass exhibited a viscosity of $10^9$ to $10^{12}$ dPa·s, the preheated preform was introduced into a cavity in the pressing mold, and precision press molding was conducted. A pressing pressure of 10 MPa was employed. Cooling of the glass and pressing mold was begun at the start of pressing. Once the molded glass had been cooled to a temperature at which it exhibited a viscosity of equal to or more than $10^{12}$ dPa·s, the molded article was removed from the mold, yielding an aspherical lens. The aspherical lens obtained had extremely good surface precision.

The lens obtained was cleaned and dried in the same manner as in Example 23, yielding a lens of both high surface quality and interior quality. An antireflective film can be provided as needed on aspherical lenses obtained by precision press molding.

What is claimed is:

1. Optical glass comprising the following components, denoted as weight percentages:
   $P_2O_5$ in a range of 18 to 70 weight percent, where 70 weight percent is excluded;
   $B_2O_3$ in a range of 0 to 34 weight percent, where 0 weight percent is excluded;
   $Al_2O_3$ in a range of 0 to 6 weight percent;
   $Li_2O$ in a range of 0 to 20 weight percent, where 0 weight percent is excluded;
   $Na_2O$ in a range of 0 to 18 weight percent;
   $K_2O$ in a range of 0 to 15 weight percent;
   MgO in a range of 0 to 25 weight percent;
   CaO in a range of 0 to 18 weight percent, where MgO+CaO>4 weight percent;
   SrO in a range of 0 to 20 weight percent;
   BaO in a range of 0 to 40 weight percent, where SrO+BaO>1 weight percent and $BaO/B_2O_3$, as a weight percentage ratio, is 0 to 15;
   ZnO in a range of 0 to 14 weight percent, where the ratio of ΣR"O/ΣR'O, as a weight percentage ratio, is equal to or less than 25, where ΣR"O=MgO+CaO+SrO+BaO+ZnO and ΣR'O=$Li_2O$+$Na_2O$+$K_2O$;
   $Gd_2O_3$ in a range of 0 to 18 weight percent; and
   $Sb_2O_3$ in a range of 0 to 1 weight percent,
   wherein the content of the component contained in the largest quantity other than $P_2O_5$, $B_2O_3$, $Al_2O_3$, $Li_2O$, $Na_2O$, $K_2O$, MgO, CaO, SrO, BaO, ZnO, $Gd_2O_3$ and $Sb_2O3$ is lower than the contents of both $B_2O_3$ and $Li_2O$,
   wherein said glass has an Abbé number of equal to or greater than 58 and a glass transition temperature of equal to or less than 570 degree Celsius, and has an alkalinity resistance defined as a rate of weight reduction of equal to or less than 17 micrograms/($cm^2$·hour) when the surface of said optical glass which has been optically polished is immersed in 0.01 mole/liter of NaOH aqueous solution at 50 degree Celsius, and
   wherein said glass has a thermal stability such that a glass piece of said optical glass, which has been heated at a rate of 30 degree Celsius/minute to 610 degree Celsius, maintained at 610 degree Celsius for 10 minutes, and then stood to cool, comprises equal to or fewer than 10 inside crystal particles 100 nm or larger in size per $cm_3$.

2. The optical glass of claim 1, which has a haze value of equal to or less than 10 weight percent.

3. The optical glass of claim 1, which comprises greater than 0 weight percent but equal to or less than 25 weight percent of MgO.

4. The optical glass of claim 1, which comprises 0.6 weight percent to 34 weight percent of $B_2O_3$, where $P_2O_5$/$B_2O_3$, as a weight percent ratio, is 2.04 to 30.

5. A precision press molding preform being comprised of the optical glass of claim 1.

6. A method for manufacturing a precision press molding preform, wherein glass melt of a prescribed weight is separated from glass melt flow flowing out from an outflow pipe to form a precision press molding preform comprised of the optical glass of claim 1.

7. A method for manufacturing a precision press molding preform, wherein glass melt is caused to flow out and molded to obtain a glass molded article, and then the obtained glass molded article is mechanically processed to manufacture a precision press molding preform comprised of the optical glass of claim 1.

8. An optical element being comprised of the optical glass of claim 1.

9. A method for manufacturing an optical element, comprising heating the precision press molding preform of claim 5 and precision press molding said heated preform with a pressing mold.

10. A method for manufacturing an optical element, comprising heating the precision press molding preform manufactured by the method of claim 6 and precision press molding said heated preform with a pressing mold.

11. A method for manufacturing an optical element, comprising heating the precision press molding preform manufactured by the method of claim 7 and precision press molding said heated preform with a pressing mold.

12. The method for manufacturing an optical element of claim 9, wherein said preform is introduced into a pressing mold, heated together with the pressing mold and then precision press molded.

13. The method for manufacturing an optical element of claim 9, wherein said preform that has been preheated is introduced into a pressing mold and then precision press molded.

14. The method for manufacturing an optical element of claim 10, wherein said preform is introduced into a pressing mold, heated together with the pressing mold and then precision press molded.

15. The method for manufacturing an optical element of claim 10, wherein said preform that has been preheated is introduced into a pressing mold and then precision press molded.

16. The method for manufacturing an optical element of claim 11, wherein said preform is introduced into a pressing mold, heated together with the pressing mold and then precision press molded.

17. The method for manufacturing an optical element of claim 11, wherein said preform that has been preheated is introduced into a pressing mold and then precision press molded.

18. The optical glass as claimed in claim 1 wherein there is no Nd.

* * * * *